Patented May 19, 1942

2,283,353

UNITED STATES PATENT OFFICE 2,283,353

VARNISH COMPOSITION

Irwin C. Clare, Wilmington, Del., assignor to Hercules Powder Company, Wilmington, Del., a corporation of Delaware No Drawing. Application March 8, 1938, Serial No. 194,550

15 Claims. (Cl. 260—19)

This invention relates to an improved varnish composition and to the method for the preparation thereof. More particularly it relates to alkali-resistant varnish and enamel compositions suitable, for example, for the coating of newly prepared plaster surfaces and other alkaline surfaces, and to the method for the preparation thereof.

Phenolic resins suitable for use in the preparation of varnishes are prepared by the condensation of a substituted phenol with formaldehyde or other aldehyde, in the presence of either an acid or an alkali catalyst. The use of a substituted phenol is necessary to produce a phenolic resin which is compatible with oil, without modification. An unmodified phenolic resin which is also compatible with oil may be produced by the condensation of a cresol with paraldehyde or acetaldehyde.

The combination of such unmodified phenolic resins with a drying oil to produce a varnish is believed by the art to take place at the conjugated double bond system, with the evolution of water by a mechanism which has not been explained. Such unmodified phenolics undergo a similar reaction with conjugated double bond systems in resins, such as, for example, rosin and ester gum. When unmodified phenolic resins are cooked with drying oils, the resulting varnish has better resistance to alkali and water than the previously known oleoresinous compositions. However, the drying oil itself, being easily saponified, lowers the alkali resistance of the varnish in the proportion in which it is present.

Unmodified phenolic resins of the type suitable for use in varnishes are subject to progressive polymerization on heating, so that an unmodified phenolic resin-drying oil reaction mixture is subject to gelation before proper incorporation with the drying oil has been obtained, and frequently the temperatures best suited to processing the drying oil cannot be used.

In order to obtain satisfactory processing of the drying oil in the manufacture of a phenolic resin varnish and to avoid objectionable foaming during the cooking, it has been the practice to modify or dilute the phenolic resin with limed rosin, ester gum, etc. Even after the dilution of an alkali-condensed phenolic resin, it is necessary to utilize high percentages of drying oil to avoid gelation. As a result of the dilution of the phenolic resin and the high percentage of drying oil which must be used, the resulting varnishes are far less resistant to alkalies than the original phenolic resin.

A varnish may be prepared from an acid-condensed phenolic resin, using materially less oil than is necessary for the production of a varnish with an alkali-condensed phenolic resin. However, when such varnishes are prepared using small proportions of drying oil, they are found to have poor adhesion and to be brittle and friable, so that their protective value is negligible.

Now, it is the object of this invention to avoid the difficulties heretofore experienced in attempting to prepare highly alkali-resistant varnish and enamel coatings and to provide such coatings which are highly alkali-resistant and which are suitable for the coating of "green" plaster surfaces, damp concrete, and other highly alkaline surfaces which could not heretofore be coated satisfactorily with varnish and enamel compositions.

A further object of this invention is to provide a varnish composition which contains a high proportion of phenolic resin and shows the advantageous alkali-resistance thereof and, in addition, shows the toughness, flexibility and adhesion usually shown only be varnishes containing high proportions of oil.

A still further object of this invention is to provide a method by which a varnish or enamel composition may be prepared which contains a high proportion of phenolic resin, without the difficulties heretofore experienced with gelation and foaming during the cooking.

The composition in accordance with this invention with which I accomplish the above objectives, will comprise a varnish prepared by cooking an unmodified, oil-compatible, phenolic resin with a liquid resin having a conjugated double bond system and a drying oil and then thinning with a volatile solvent. It will, in addition contain a metallic drier and may or may not contain pigment ground therein, as may be desired.

The varnish composition in accordance with this invention will desirably be of a short oil length type to secure a maximum alkali resistance, although for other purposes the oil length may vary over a wide range. For high resistance to alkali, I prepare a varnish having an oil length within the range of about 4 to about 24 gallons of oil per 100 lbs. of resin and preferably about 5 to about 15 gallons of oil per 100 lbs. of resin. In other words, the non-volatile portion may contain about 20% to about 70%, by weight, of drying oil and preferably about 28% to about 54%, by weight, of drying oil. The unmodified phenolaldehyde resin may constitute from about 1% to about 75%, by weight, of the total resin contained in the varnish and will preferably fall within the range of about 10% to about 60%, by weight, thereof. The total resin content includes the liquid resin having a conjugated double bond system and the unmodified phenolic resin.

The unmodified phenolic resin which I utilize in my varnish composition may be, for example, any oil-soluble, phenolaldehyde type resin of either the alkali condensed or acid condensed types, produced by the reaction of a substituted phenol or a cresol with an aldehyde such as, formaldehyde, acetaldehyde, crotonaldehyde, benzaldehyde, furfuralaldehyde, or one of their homologues, thus, for example, it may be an alkali-condensed para-phenylphenol-formaldehyde resin, an alkali-condensed para-tertiary amylphenol-formaldehyde resin, an acid-condensed para-tertiary butylphenol-formaldehyde resin, an acid-condensed meta- and/or para-cresol-acetaldehyde resin, etc.

The liquid resin having a conjugated system of double-bonds, which I may use may be, for example, a liquid derivative of wood rosin, American gum rosin, French gum rosin, etc., formed by reaction within a lower aliphatic alcohol, such as, methyl alcohol, ethyl alcohol, isopropyl alcohol, propyl alcohol, butyl alcohol, etc. benzyl alcohol etc. It may be formed by the decarboxylation of a rosin with or without the use of a catalyst. Thus, I may use abietene. Again, it may be a rosin, rosin ester or a decarboxylated rosin which has been partially hydrogenated. In general, I prefer to use a methyl or ethyl ester of wood rosin, which I shall refer to herein as methyl abietate and ethyl abietate, respectively.

The drying oil which I use may be any of the drying oils or semi-drying oils commonly used in the preparation of varnishes and paints. Thus, for example, I may use tung oil, soya bean oil, fish oil, rape seed oil, hemp seed oil, linseed oil, oiticica oil, perilla oil, dehydrated castor oil, etc. For the preparation of quick drying varnishes I prefer, in general, to utilize tung oil. The drying oil used may be in the raw state or may be subjected to the various heat-bodying, oxidizing or thermolyzing processes known to the art and then used. The drying oil may be used alone or in admixture with other drying oils or it may be used in admixture with a semidrying oil such as, for example, soya bean oil, fish oil, etc. When using a semi-drying oil in admixture with a drying oil, the proportion of semi-drying oil must not be sufficiently high to adversely affect the drying characteristics. I may utilize any type of drier or combination of driers suitable for use in paints and varnishes, such as, for example, cobalt, iron, zinc, lead, or manganese resinates, naphthenates, linoleates, oleates, or mixtures of these materials. I may also use drying salts such as cobalt ethyl phthalate, cobalt acetate, manganese borate, etc.; oxides, such as, litharge, red lead, manganese dioxide, etc.

Any suitable volatile solvent may be added to the composition in accordance with this invention to secure the desired consistency for application. The amount of the volatile solvent added is controlled by the consistency of the resins and oils used, the conditions of cooking, etc., and will usually be within the range of about 10% to about 75%, by weight, of the total varnish composition. Suitable volatile solvents for the purpose are, for example, turpentine, benzol, toluol, xylol and the commercial xylol mixture known as Hi-Flash Naphtha; petroleum hydrocarbons, such as that known to the trade as V. M. and P. Naphtha, Varsol, etc., the hydrogenated petroleum solvents known by the trade name of Solvesso, etc.

The procedure for the preparation of the varnish composition in accordance with this invention involves heating a mixture of a liquid resin having a conjugated double-bond system, or a mixture of such liquid resins, with an unmodified, oil-compatible phenolic type resin, or a mixture of such phenolic resins, and a drying oil, a mixture of drying oils or mixture of drying and semi-drying oils, to a maximum temperature within the range of about 320° F. to about 600° F. The exact temperature used will depend upon the particular phenolic resin used. The oil may be included entirely or in part at the beginning of the cook or added after the resins have been cooked together. After the maximum temperature has been reached, the batch is then maintained at this temperature or at a temperature not below about 450° F. until the desired consistency is obtained. The composition is then allowed to cool to a temperature sufficiently low to avoid excessive evaporation of the thinning solvent, usually about 400°–450° F., and then thinned to a consistency suitable for application. A drier may then be added or, if desired, may be incorporated during the cooking of the varnish by methods well known to the art. After the addition of the drier, the composition is suitable for application as a clear coating. If it is desired to produce an enamel, the necessary pigment, pigments or pigments and inerts are ground into the varnish after it is thinned with the volatile solvent, or the necessary pigment or pigments may be ground into the clear coating described heretofore.

As specific illustrations of the procedure for the production of varnish compositions in accordance with this invention, the following examples may be cited:

Example I

Three hundred and sixty parts by weight of methyl abietate, 40 parts by weight of an alkali-condensed, para-phenyl-phenol formaldehyde resin and 156 parts by weight of China wood oil were heated to a temperature of about 450° F. and held until the reaction was complete. The temperature was then lowered to 420° F., the mixture reduced by the addition of 250 parts by weight of Varsol and a drier consisting of 4 parts by weight of 24% lead naphthenate solution, 5 parts by weight 6% manganese naphthenate solution and 1 part by weight of a 6% cobalt naphthenate solution added thereto. The varnish so produced had the following properties:

Viscosity (Gardner-Holdt scale) _____ A
Color (Hellige scale) _____ 5L
Non-volatile _____ per cent __ 69

This varnish dries to a tough reagent resistant film. It will be noted that the non-volatile content is 25% greater than can be obtained by the use of a phenol-aldehyde resin with ordinary ester gum. In spite of this, the viscosity is about that of raw linseed oil, which promotes exceptional ease of application.

Example II

Two hundred and thirty-four parts by weight of China wood oil and 25 parts by weight of methyl abietate were heated to a temperature of 565° F. This mixture was then chilled by the addition of 200 parts by weight of methyl abietate and 75 parts by weight of an alkali-condensed para-tertiary butylphenol-formaldehyde resin added thereto. The temperature was then raised to 450° F. and held at that point until a reaction was completed, as shown by the cessation of the evolution of gaseous bubbles, and for an additional period to secure the desired body or viscosity of the product. The product was cooled, reduced with 437 parts by weight of mineral spirits and 4 parts by weight of a 24%, by weight, lead naphthenate and 3 parts by weight of a 6% by weight cobalt naphthenate solution added. The varnish so produced had the following characteristics:

| | |
|---|---|
| Viscosity (Gardner-Holdt scale) | A |
| Color (Hellige scale) | 4 |
| Non-volatile per cent | 55 |

Example III

One hundred and fifty parts by weight of methyl abietate, 150 parts by weight of an alkali-condensed para-tertiary butylphenol-formaldehyde resin and 117 parts by weight of China wood oil were heated to 450° F. and held at that temperature until there was no further evidence of reaction. An additional 117 parts by weight of China wood oil was then added and the temperature of the batch raised to 565° F. The temperature was then dropped to 465° F. and held until a 40-inch string could be obtained from a cold pill of the varnish. It was then cooled and reduced by the addition of 437 parts by weight of mineral spirits. A drier consisting of 4 parts by weight of a 24% by weight lead naphthenate and 2 parts by weight of a 6% by weight cobalt naphthenate solution was then added. The varnish so produced dries to a tough reagent resistant film with excellent adhesion and had the following characteristics:

| | |
|---|---|
| Viscosity (Gardner-Holdt scale) | C |
| Color (Hellige scale) | 7L |
| Non-volatile per cent | 55 |

This example illustrates an advantage of the use of methyl abietate over the use of ester gum. Any attempt to combine the above quantity of an alkali condensed para-tertiary butylphenol-formaldehyde resin with ester gum in varnish of this type would result in excesive foaming and gelation of the batch.

Example IV

One hundred and fifty parts by weight of methyl abietate and 50 parts by weight of alkali-condensed para-tertiary amyl-phenol-formaldehyde resin were heated to 450° F. and held at that temperature until the reaction was complete. Two hundred thirty-four parts by weight of China wood oil were then heated and the temperature raised to 565° F. The reaction mixture was then allowed to cool to 465° F. and then held until it would give a 40-inch string off a cold pill of the varnish. It was then cooled, reduced by the addition of 434 parts by weight of mineral spirits and a drier consisting of 4 parts by weight of 24%, by weight, lead naphthenate solution and 2 parts by weight of a 6%, by weight, cobalt naphthenate solution added thereto. It had the following characteristics:

| | |
|---|---|
| Viscosity (Gardner-Holdt scale) | C |
| Color (Hellige scale) | 5L |
| Non-volatile per cent | 50 |

This varnish makes an excellent vehicle for a concrete floor paint. The following formulation is suitable for this use:

| | | |
|---|---|---|
| Titanated lithopone | ounces | 10 |
| Lampblack | grams | 3.6 |
| Ultramarine Blue | do | 7.1 |
| Med. C. P. Chrome Yellow | do | 1.8 |
| Whiting | ounces | 2 |
| Vehicle (prepared as described above) | do | 16 |

Example V

Fifty parts by weight of methyl abietate, 50 parts by weight of an alkali-condensed para-tertiary butylphenol-formaldehyde resin and 24 parts by weight of China-wood oil were heated to 450° F. and held until the reaction was completed. An additional 147.6 parts by weight of China-wood oil was added and the temperature raised to 540° F. The batch was then chilled back by the addition of 24 parts by weight of heat-bodied linseed oil (Q body), allowed to cool to 465° F. and held at that temperature until the desired viscosity was reached. The batch was then cooled and reduced by the addition of 297 parts by weight of mineral spirits and a drier consisting of 3.6 parts by weight of a 24% by weight lead naphthenate solution and 1 part by weight of a 6% by weight cobalt naphthenate solution added thereto. The varnish so produced had the following characteristics:

| | |
|---|---|
| Viscosity (Gardner-Holdt scale) | B |
| Color (Hellige scale) | 5 |
| Non-volatile per cent | 50 |

Example VI

Three hundred parts by weight of methyl abietate, 100 parts by weight of acid-condensed para-tertiary amylphenol-formaldehyde resin and 156 parts by weight of China-wood oil were heated to 450° F. in 45 minutes. The mixture was held at this temperature for 20 minutes, cooled and reduced by the addition of 300 parts by weight of Varsol. The product had the following characteristics:

| | |
|---|---|
| Viscosity (Gardner-Holdt scale) | A |
| Color (Hellige scale) | 3 |

Example VII

Two hundred parts by weight of methyl abietate, 100 parts by weight of acid-condensed para-tertiary butylphenol-formaldehyde resin and 117 parts by weight of China-wood oil were heated to 450° F. and held at that temperature for 10 minutes. An additional 117 parts by weight of China-wood oil was added and the temperature raised to 565° F. The mixture was allowed to cool to 475° F. and held until it would give a 40-inch string from a cold pill of the varnish. It was then cooled, reduced by the addition of 437 parts by weight of mineral spirits, and had the following characteristics:

| | |
|---|---|
| Viscosity (Gardner-Holdt scale) | C |
| Color (Hellige scale) | 5 |

Example VIII

Three hundred parts by weight of methyl abietate, 100 parts by weight of acid-condensed metaand para-cresol-acetaldehyde resin and 156 parts by weight of China-wood oil were heated to 450° F. in 45 minutes and held at that temperature for a period of 20 minutes. The mixture was then cooled and reduced by the addition of 300 parts by weight of a hydrogenated petroleum solvent known by the trade name of "Solvesso #2." The varnish so produced had the following characteristics:

Viscosity (Gardner-Holdt scale) _____ A
Color (Hellige scale) _____ 3

Example IX

One hundred and fifty parts by weight of abietene, 50 parts by weight of alkali-condensed p-phenylphenol-formaldehyde resin and 78 parts by weight of China wood oil were heated to 450° F. and held at that temperature until there was no further evidence of reaction. The mixture was then reduced by the addition of 150 parts by weight of Varsol and a drier mixture consisting of 2 parts by weight of a 24% by weight of a solution of lead naphthenate, 2.5 parts by weight of a 6% by weight solution of manganese naphthenate and 0.5 part by weight of a 6% by weight cobalt naphthenate solution were added thereto. The varnish so produced had the following characteristics:

Viscosity (Gardner-Holdt scale) _____ A
Color (Hellige scale) _____ 6

Example X

The following ingredients were made into a varnish following the procedure given in Example IX.

| | Parts by weight |
|---|---|
| Benzyl abietate | 150 |
| Alkali-condensed p-phenyl-phenol-formaldehyde resins | 50 |
| China-wood oil | 78 |
| Varsol (mineral spirits) | 150 |
| 24% by weight lead naphthenate solution | 2 |
| 6% by weight manganese naphthenate solution | 2½ |
| 6% by weight cobalt naphthenate solution | ½ |

The varnish so produced had the following characteristics:

Viscosity (Gardner-Holdt scale) _____ D
Color (Hellige scale) _____ 5

Example XI

A mixture of 22½ parts by weight of amyl abietate, 7.5 parts by weight of an alkali-condensed p-phenylphenol-formaldehyde resin and 11.7 parts by weight of China wood oil were heated to 450° F. and held at that temperature until the reaction had stopped. An additional 11.7 parts by weight of China wood oil was then added and the reaction mixture heated to 565° F. The mixture was then allowed to cool to 465° F. and held until it would give a 40-inch string off a cold pill of the varnish. The mixture was then cooled and reduced by the addition of 43.7 parts by weight of mineral spirits. A drier mixture consisting of 0.3 part by weight of a 24% by weight of lead naphthenate solution and 0.15 part by weight of a 6% by weight cobalt naphthenate solution was added thereto. The varnish so produced had the following characteristics:

Viscosity (Gardner-Holdt scale) _____ F
Color (Hellige scale) _____ 6

Example XII

A varnish was prepared from the following ingredients using the same procedure described in Example XI.

| | Parts by weight |
|---|---|
| Abietene neutral rosin oil (b. p. 192–212° F. at 1 mm.) | 75 |
| Alkali-condensed p-phenyl-phenol-formaldehyde resin | 25 |
| China-wood oil | 78 |
| 24% by weight lead naphthenate | 1 |
| 6% by weight cobalt naphthenate | 0.5 |
| Mineral spirits | 145.7 |

The varnish so produced had the following characteristics:

Viscosity (Gardner-Holdt scale) _____ C
Color (Hellige scale) _____ 7L

A coating may be formed from the compositions in accordance with this invention by air-drying or by baking. The compositions heretofore illustrated are formulated primarily for air-drying, but may also be used for low-temperature baking. In compositions intended for high temperature baking the drier will be materially reduced in amount or entirely omitted, according to the baking schedule.

It will be understood that the examples given hereinbefore are by way of illustration and not by way of limitation of the invention as broadly described and claimed herein.

What I claim and desire to protect by Letters Patent is:

1. A varnish composition comprising as an ingredient the product of the reaction of a liquid derivative of a rosin, said derivative having a conjugated system of double bonds in the rosin nucleus, an unmodified oil-soluble phenol-aldehyde resin and a drying oil at a maximum temperature within the range of about 320° F. to about 600° F.

2. A varnish composition comprising as an ingredient the product of the reaction of a liquid monohydric alcohol ester of a rosin having a conjugated system of double bonds, an unmodified oil-soluble phenol-aldehyde resin and a drying oil at a maximum temperature within the range of about 320° F. to about 600° F.

3. A varnish composition comprising as an ingredient the product of the reaction of a liquid lower aliphatic alcohol ester of a rosin having a conjugated system of double bonds, an unmodified oil-soluble phenol-aldehyde resin and a drying oil at a maximum temperature within the range of about 320° F. to about 600° F.

4. A varnish composition comprising as an ingredient the product of the reaction of a methyl ester of a rosin having a conjugated system of double bonds, an unmodified oil-soluble phenol-aldehyde resin and a drying oil at a maximum temperature within the range of about 320° F. to about 600° F.

5. A varnish composition comprising as an ingredient the product of the reaction of an ethyl ester of a rosin having a conjugated system of double bonds, an unmodified oil-soluble phenol-aldehyde resin and a drying oil at a maximum temperature within the range of about 320° F. to about 600° F.

6. A varnish composition comprising as ingredients a drier, a volatile solvent and the product of the reaction of a liquid lower aliphatic alcohol ester of a rosin having a conjugated system of double bonds, an unmodified oil-soluble phenol-aldehyde resin and a drying oil at a maximum temperature within the range of about 320° F. to about 600° F.

7. A varnish composition comprising as an ingredient the product of the reaction of a liquid monohydric alcohol ester of a wood rosin having a conjugated system of double bonds, an unmodified oil-soluble phenol-aldehyde resin and a drying oil at a maximum temperature within the range of about 320° F. to about 600° F.

8. A varnish composition comprising as ingredients the product of the reaction of a liquid lower aliphatic alcohol ester of a wood rosin having a conjugated system of double bonds, an unmodified oil-soluble phenol-aldehyde resin and a drying oil at a maximum temperature within the range of about 320° F. to about 600° F.

9. A varnish composition comprising as an ingredient the product of the reaction of methyl abietate, an unmodified oil-soluble phenol-aldehyde resin and a drying oil at a maximum temperature within the range of about 320° F. to about 600° F.

10. A varnish composition comprising as an ingredient the product of the reaction of ethyl abietate, an unmodified oil-soluble phenol-aldehyde resin and a drying oil at a maximum temperature within the range of about 320 F. to about 600° F.

11. A varnish composition comprising as an ingredient the product of the reaction of a liquid decarboxylated derivative of a rosin having a conjugated system of double bonds an unmodified oil-soluble phenol-aldehyde resin and a drying oil at a maximum temperature within the range of about 320° F. to about 600° F.

12. A varnish composition comprising as an ingredient the product of the reaction of a liquid abietene having a conjugated system of double bonds, an unmodified oil-soluble phenol-aldehyde resin and a drying oil at a maximum temperature within the range of about 320° F. to about 600° F.

13. A varnish composition comprising as an ingredient the product of the reaction of a liquid lower aliphatic alcohol ester of a rosin having a conjugated system of double bonds, an unmodified oil-soluble phenol-aldehyde resin and a drying oil at a maximum temperature within the range of about 320° F. to about 600° F., the said drying oil being in amount within the range of about 20% to about 70% by weight of the total non-volatile content of the varnish composition.

14. A varnish composition comprising as an ingredient the product of the reaction of a liquid lower aliphatic alcohol ester of a rosin having a conjugated system of double bonds, an unmodified oil-soluble phenol-aldehyde resin and a drying oil at a maximum temperature within the range of about 320° F. to about 600° F., the said drying oil being in amount within the range of about 28% to about 54% by weight of the total non-volatile content of the varnish composition.

15. A varnish composition comprising as an ingredient the product of the reaction of a liquid lower aliphatic alcohol ester of a rosin having a conjugated system of double bonds, an unmodified oil-soluble phenol-aldehyde resin and a drying oil at a maximum temperature within the range of about 320° F. to about 600° F., the said drying oil being in amount within the range of about 28% to about 54% by weight of the total non-volatile content of the varnish composition and the phenolic resin comprising within the range of about 10% to about 60% by weight of the total resin content of the varnish composition.

IRWIN C. CLARE.